US011643342B2

(12) United States Patent
Katoshevski et al.

(10) Patent No.: US 11,643,342 B2
(45) Date of Patent: May 9, 2023

(54) PROCESS AND APPARATUS FOR PURIFYING LIQUID

(71) Applicant: B.G. Negev Technologies & Applications Ltd., at Ben-Gurion University, Beer-Sheva (IL)

(72) Inventors: David Katoshevski, Omer (IL); Asher Brenner, Omer (IL); Daphne Meidan, Yavne (IL); Eran Halfi, Arad (IL)

(73) Assignee: B.G. Negev Technologies & Applications Ltd., at Ben-Gurion University, Beer-Sheva (IL)

( * ) Notice: Subject to any disclaimer, the term of this patent is extended or adjusted under 35 U.S.C. 154(b) by 527 days.

(21) Appl. No.: 16/491,806

(22) PCT Filed: Mar. 8, 2018

(86) PCT No.: PCT/IL2018/050274
§ 371 (c)(1),
(2) Date: Sep. 6, 2019

(87) PCT Pub. No.: WO2018/163183
PCT Pub. Date: Sep. 13, 2018

(65) Prior Publication Data
US 2020/0262721 A1    Aug. 20, 2020

Related U.S. Application Data

(60) Provisional application No. 62/468,964, filed on Mar. 9, 2017.

(51) Int. Cl.
*C02F 1/34* (2006.01)
*B01D 21/28* (2006.01)
(Continued)

(52) U.S. Cl.
CPC .............. *C02F 1/34* (2013.01); *B01D 21/283* (2013.01); *B01F 31/65* (2022.01); *C02F 1/5245* (2013.01); *C02F 2103/001* (2013.01)

(58) Field of Classification Search
CPC ..... C02F 1/34; C02F 1/52; C02F 1/32; B01D 21/28; B01F 11/00
See application file for complete search history.

(56) References Cited

U.S. PATENT DOCUMENTS 4,351,733 A    9/1982 Salzer et al.
4,877,516 A    10/1989 Schram
(Continued)

FOREIGN PATENT DOCUMENTS

CN    202185187 U    4/2012
JP    2013180266 A    9/2013
(Continued)

OTHER PUBLICATIONS

Sedimentation Tank for Muddy Water Shimizu Hideki; Yamamoto Tatsuo; Fukuda Atsushi; Akamatsu Yusuke; Mayu, Sue; Maeda Atsushi; Hashimoto Akihiko (Inventors). Maeda Corp; Shin Nippon Kogyo KK (Assignees). JP 2013180266 A. (Published Sep. 12, 2013). (Year: 2013).*

(Continued)

*Primary Examiner* — Walter D. Griffin
*Assistant Examiner* — Cameron J Allen
(74) *Attorney, Agent, or Firm* — McCormick, Paulding & Huber PLLC

(57) ABSTRACT

Disclosed herein are systems and methods of purification of liquid from colloidal particles. More specifically, disclosed are systems and methods for treating water by effecting aggregation of colloidal particles and thus improving their sedimentation, by enhancing grouping of the particles using accelerating, decelerating, and reversing velocity gradients (Continued)

within the liquid. The disclosed methods and systems for water treatment allow for continuous treatment of a contaminated water stream in a single flocculation and sedimentation vessel (i.e. a hybrid process).

13 Claims, 11 Drawing Sheets

(51) Int. Cl.
    *C02F 1/52*               (2023.01)
    *B01F 31/65*           (2022.01)
    *C02F 103/00*         (2006.01)

(56) References Cited

U.S. PATENT DOCUMENTS

| | | |
|---|---|---|
| 5,164,094 A | 11/1992 | Stuckart |
| 5,338,421 A | 8/1994 | Abe et al. |
| 5,855,776 A | 1/1999 | Bowe et al. |
| 6,325,957 B1 | 12/2001 | Kumacheva et al. |
| 7,150,779 B2 | 12/2006 | Meegan, Jr. |

FOREIGN PATENT DOCUMENTS

| | | | |
|---|---|---|---|
| WO | WO-9746607 A1 * | 12/1997 | ............ B01J 14/00 |
| WO | 2014176559 A1 | 10/2014 | |

OTHER PUBLICATIONS

Winter et al., "Grouping Dynamics of Suspended Matter in Tidal Channels", J. Geophysical Research (JGR), vol. 112, Aug. 2007.
Katoshevski, D., "Characteristics of Spray Grouping/ Non-Grouping Behavior", Aerosol and Air Quality Research, vol. 6 (1), pp. 54-66, and Katoshevski et al., "Particle Grouping in Standing and Moving Wave Velocity Fields", International Journal of Engineering Systems Modelling and Simulation (IJESMS), vol. 2, pp. 177-182, 2010.
Katoshevski, D., Dodin, Z., & Ziskind, G. (2005). Aerosol clustering in oscillating flows: mathematical analysis. Atomization and sprays, 15(4).
Katoshevski, D., Ruzal, M., Shakked, T., and Sher, E., (2010), "Particle Grouping, a New Method for Reducing Emission of Submicron Particles from Diesel Engines", Fuel, 89:2411-2416.
Katoshevski et al., "Particle Grouping in Standing and Moving Wave Velocity Fields", International Journal of Engineering Systems Modelling and Simulation (IJESMS), vol. 2, pp. 177-182, 2010.

* cited by examiner

Table 1

| Test type | Flocculant (mg/L) | Turbidity removal (%) at time points (min) | | | | | |
|---|---|---|---|---|---|---|---|
| | | 0 | 5 | 10 | 15 | 20 | 30 |
| Jar test | 6 | 40.8 | 52.1 | 46.0 | 58.9 | 67.2 | 99.2 |
| Oscillation type 1 | 6 | 46.5 | 51.0 | 61.6 | 66.6 | 72.0 | 99.3 |
| Oscillation type 2 | 6 | 48.3 | 71.2 | 99.5 | 99.2 | 99.2 | 99.5 |
| | 3 | 46.4 | 47.4 | 52.3 | 64.3 | 57.3 | 66.2 |
| | 4 | 40.0 | 59.6 | 61.0 | 62.7 | 99.2 | 99.3 |

FIGURE 7

Table 2

| Aluminum sulfate concentration (mg/L) | Solids removal, by technique (%) | | |
|---|---|---|---|
| | Oscillation | | Jar test |
| | Type 1 | Type 2 | |
| 0 | 31 | Not tested | 37.7 |
| 2 | 46.5 | 66.2 | 63.9 |
| 4 | 59.8 | 99.3 | 69.5 |
| 6 | 99.5 | 99.5 | 91.1 |
| 8 | 99.6 | Not tested | 99.4 |

FIGURE 8

Table 3

| Added alum (mg/L) | Turbidity removal(%), SD/ particle size (nm), SD | | |
|---|---|---|---|
| | Jar test | rectangular | circular |
| 0 | 38, 5/ 189, 47 | 18,5/ 427, 56 | 31, 6/ 368, 87 |
| 2 | 64, 8/ 203, 70 | 36,11/ 426, 50 | 47, 6/ 517, 43 |
| 4 | 69, 9/ 433, 43 | 65, 5/ 1044, 37 | 60, 7/ 1701, 65 |
| 6 | 91, 6/ 640, 78 | 99, 9/ 2313, 62 | 99, 19/ 2111, 50 |
| 8 | 99, 9/ 899, 51 | 100, 16/ 3108, 32 | 100, 9/ 2986, 27 |

FIGURE 9

Table 4

| Frequency (Hz) | 0.1 | | | | 0.5 | | | | 1 | | | |
|---|---|---|---|---|---|---|---|---|---|---|---|---|
| | Alum concentration (mg/L) | | | | | | | | | | | |
| | 0 | 5 | 10 | 20 | 0 | 5 | 10 | 20 | 0 | 5 | 10 | 20 |
| 15 min oscillation | 8, 3.2 | 50, 10.1 | 67, 11.2 | 75, 9.9 | 12, 4.4 | 60, 22.3 | 79, 5.1 | 86, 6.8 | 4, 0.9 | 1, 0.6 | 3, 0.6 | 1, 1.2 |
| 30 min oscillation | 15, 4.7 | 73, 4.2 | 84, 4.8 | 83, 8.1 | 18, 9.7 | 74, 12.5 | 90, 3.4 | 94, 3.7 | 3, 4.6 | 1, 1.2 | 5, 4 | 16, 12 |
| 30 min oscillation & 30 min of settling | 24, 10.3 | 84, 3.9 | 89, 4.4 | 92, 2.8 | 33, 9.5 | 93, 2.6 | 97, 0.5 | 98, 0 | 16, 2.6 | 70, 6 | 91, 5 | 95, 0.6 |

FIGURE 10

PROCESS AND APPARATUS FOR PURIFYING LIQUID

CROSS-REFERENCE TO RELATED APPLICATIONS

This application is a National Stage application of International Patent Application No. PCT/IL2018/050274, filed on Mar. 8, 2018, which claims priority to U.S. Patent Application No. 62/468,964, filed on Mar. 9, 2017 each of which is hereby incorporated by reference in its entirety.

TECHNICAL FIELD

The present invention pertains to the field of purification of liquid from colloidal particles. More specifically, the present invention relates to a system and method for treating water by effecting aggregation of colloidal particles and thus improving their sedimentation, by enhancing grouping of the particles using accelerating, decelerating, and reversing velocity gradients within the liquid.

BACKGROUND

Water scarcity in many regions of the world is a growing problem due to population growth, industrial pollution, and climate change. This problem requires a careful water resources management that integrates water resource augmentation and pollution control. Inorganic particulates exist in natural surface water and include clay, silt and mineral oxides. It is required to remove these inorganic particulates from water since they can adsorb toxic compounds (e.g., heavy metals) to their surface area, create shelter environment for viruses, bacteria and protozoa, and cause the water to be turbid as well as impart color to it.

Removal of colloidal particles, including microorganisms, is a crucial task in any water treatment facility. Prior art methods applied for this purpose are multi-stage processes comprising coagulation, flocculation, sedimentation, and filtration. Coagulation and flocculation process stages are usually agitated by mechanical mixers or by hydraulic means to enhance particles aggregation with the aid of added chemicals (i.e. coagulants or flocculants). The sedimentation usually involves stagnant conditions in a specialized area.

The sedimentation and filtration following the coagulation/flocculation, are common techniques for removing this particulate matter from water. Coagulation is usually a prominent preliminary short stage where chemicals are added and mixed intensively. The objective of coagulation and flocculation is to turn discrete colloids, among them mineral colloids (stable and negatively charged particles with a diameter smaller than 10 microns, which typically take a very long time to settle), into larger aggregates, termed flocs, which then can be settled or filtered by available means. Additionally, increasing particle size can aid preventing membrane fouling. Aggregation technique comprises two stages. The first is coagulation which involves addition of coagulants (usually metal ions, e.g. $Al^{3+}$ and $Fe^{3+}$) which destabilizes the suspended particles by neutralizing their electric charge. The second stage is flocculation which involves gentle mixing to enhance collision between the destabilized particles to form larger aggregates.

The following prior-art references describe methods available nowadays to purify water from colloidal particles. U.S. Pat. No. 4,877,516 describes an acoustic standing wave established in a fluid medium with a varying energy density in its nodal planes. U.S. Pat. No. 4,351,733 discloses a process and apparatus for the purification of industrial waste water containing solid particles. U.S. Pat. No. 5,855,776 discloses an apparatus for an on-line treatment of chemical reagents. U.S. Pat. No. 5,164,094 discloses a process for the flocculation, precipitation, agglomeration or coagulation of substances or microorganisms present in a liquid in a dissolved, colloidally dissolved, suspended or emulsified state and a device for carrying out the process. U.S. Pat. No. 6,325,957 discloses a method of producing three-dimensional ordered arrays of particles. The method may be used for the preparation of nanocomposite materials with highly periodic structures. More particularly the disclosure provides a method of producing three dimensional arrays based on applying a controlled oscillatory motion to settling dispersions of colloid particles. WO 2014/176559 describes active pharmaceutical ingredients that can be separated from their excipients by dissolving a pharmaceutical product (e.g. tablet, pill) into a solvent, then running the solution through an acoustophoretic device. U.S. Pat. No. 5,338,421 describes a method of separating an aqueous colloidal solution by agglomeration into water and agglomerate of colloidal particles by applying voltage to the aqueous colloidal solution to promote the agglomeration of colloidal particles. U.S. Pat. No. 7,150,779 describes an acoustic agglomerator for agglomerating constituents in a fluid. The acoustic agglomerator includes an area containing a fluid having constituents and an acoustic generator operable to generate a modulated acoustic field to enhance agglomeration of the constituents in the fluid.

Thus, there are numerous apparatuses and processes available for purifying water from colloidal particles. These purification processes are based sometimes on acoustic manipulations, wherein the mean velocities of the suspended particles are zero, such as in principle they move around their initial location. The acoustic pressure waves do not allow the suspended particles to collide with other particles located at a relatively large distance apart, particularly in somewhat diluted suspensions. Other approaches include particles' activation by an electric field for producing ordered three dimensional arrays and so on.

It has also been reported that small-scale suspended sediment dynamics involves transport modes where grouping of suspended particulate matter (SPM) forms distinct patterns in water (Winter et al., "*Grouping Dynamics of Suspended Matter in Tidal Channels*", *J. Geophysical Research* (*JGR*), Vol. 112, August 2007). Grain-size analysis revealed that the turbidity clouds are mainly composed of aggregates around 0.35 μm in size. To test how the formation of turbidity clouds can be related to the hydrodynamic environment and particle motion, an initial numerical model has been developed for the simulation of particle grouping (Katoshevski, D., "*Characteristics of Spray Grouping/Non-Grouping Behavior*", *Aerosol and Air Quality Research*, Vol. 6 (1), pp. 54-66, and Katoshevski et al., "*Particle Grouping in Standing and Moving Wave Velocity Fields*", *International Journal of Engineering Systems Modelling and Simulation* (*IJESMS*), Vol. 2, pp. 177-182, 2010). The simulations show stable and weakly stable modes of particle clustering, depending on the environmental conditions. A prominent dependence of group stability on the amplitude of current velocity oscillations is revealed (see FIG. 1 from Winter et al., 2007, "*Grouping Dynamics of Suspended Matter in Tidal Channels*", *J. Geophysical Research* (*JGR*), Vol. 112: C08010, August 2007). It has also been found that inertia mechanisms in the oscillating current may lead to the formation of turbidity clouds by particle grouping (Winter et al., 2007, supra). "Katoshevski, D., Dodin, Z., & Ziskind, G.

(2005). *Aerosol clustering in oscillating flows: mathematical analysis. Atomization and sprays,* 15(4)" relates to a grouping device to increase the size of particles emitted from diesel engines. This study included the development of a mathematical model which presents the governing equation of particle motion in boundless oscillating flows. The solution indicates that different grouping regions may be formed, depending on the gas flow conditions and particles' size. The actual application of the grouping theory in an exhaust system of a vehicle is presented in Katoshevski, D., Ruzal, M., Shakked, T., and Sher, E., (2010), "Particle Grouping, a New Method for Reducing Emission of Submicron Particles from Diesel Engines", *FUEL,* 89:2411-2416. It should be denoted that the operating conditions in the exhaust system in terms of flow characteristics, and geometry, and type of particles differ significantly from those in the water treatment area.

It is therefore an object of the present invention to provide an efficient method and system for water treatment, including the possibility to continuously treat a contaminated water stream in a single flocculation and sedimentation vessel (a hybrid process). It is further an object of the present invention to provide a method and system for improving separation of particulate matter via flocculation and sedimentation, preferably in a continuous manner. It is yet a further object of the present invention to provide a method and means for treating water that enables particle separation with reduced consumption of energy and chemicals. It is yet another object of the present invention to provide an apparatus and process that are simple, efficient, safe, easy to operate, and of low cost for producing water of a high quality.

Other objects and advantages of the present invention will become apparent as the description proceeds.

SUMMARY

The present invention relates to a method and a related system for water treatment based on enhancing particles grouping into larger aggregates, prior to or concomitantly with flocculation, and thereafter (or simultaneously) sedimentation of the flocs. This is caused by producing oscillating waves in the liquid as described herein. It has been unexpectedly found that by controlling the oscillatory motion of the liquid (e.g. by means of a suitable element, and movement regime) simultaneous aggregation and sedimentation is enhanced. These oscillating waves are flow waves (momentum waves) with a velocity distribution in the flow field. They cause the periodic motion of the water to cause particles to move away from their initial location and group with other particles which were initially in a relatively large distance apart. According to one preferred embodiment, the oscillatory motion generated is substantially horizontal; yet more preferably, this substantially horizontal motion is substantially perpendicular to the sedimentation motion of the particles. The controlling of the oscillatory motion may comprise adjustment of oscillation frequency, amplitude, velocity, power, shape of an oscillating element, its location and submersion in the treatment basin, etc. Thus particle aggregation can be affected significantly, enhancing flocculation and allowing subsequent or simultaneous sedimentation.

Accordingly, one aspect of the invention relates to a process for removal of colloidal particles from a liquid, e.g., an aqueous medium, comprising (i) providing along a flow axis at least one stream of said liquid contaminated with said colloidal particles, (ii) periodically and alternatingly displacing a portion of said stream in a horizontal direction (e.g. in a direction essentially perpendicular to the sedimentation of the particles, and within or parallel to the plane of the flow axis) to enable grouping of said colloidal particles, for a predetermined time interval, and (iii) separating grouped particles from the stream to provide at least a partially decontaminated stream. Preferably, the process further comprises providing a flocculating agent to said stream of contaminated liquid. Optionally, the periodically and alternatingly displacing of the liquid takes form of an oscillating motion.

Preferably, the grouping of the particles occurs prior to or essentially concomitantly with flocculation, such that separating of the flocs may be achieved within the predetermined time interval, e.g. concomitantly with the grouping and/or flocculation.

The periodical and alternating displacement of a portion of the liquid causes velocity gradients in the liquid to change intermittently in time, space, and direction, usually reversing the direction. The periodically and alternatingly displacing of a portion of the liquid may usually be carried out such that the oscillations in the liquid create a propagating or a standing wave. Moreover, the portion of the contaminated stream that is periodically displaced, i.e. wherein the velocity gradients are the highest, preferably forms at least 10% and up to 30%, or at least 10% and up to 50% of the volume of the stream, e.g. the separation jar. The flow velocity, periodicity, amplitude, and power of the oscillations are chosen such that the flow generated thereby does not break or redisperse the groups or flocs of the particles. The oscillations are therefore preferably at a frequency below 1 Hz, further preferably between 0.1 Hz and 0.5 Hz. The oscillation power, frequency and amplitude are selected according to reactor volume and flow rate of the treated water, e.g. aided by mathematical simulation, to obtain efficient flocculation and sedimentation in minimal power. A flocculating agent may be provided into the suspension to improve flocculation. The flocculating agent may be a polyvalent ionic compound, such as aluminum sulfate, polyaluminum sulfate, or ferric chloride, or organic polymers, or combination of aiding chemicals.

Accordingly, a further aspect of the invention is a process for the removal of colloidal particles from a liquid, e.g., an aqueous liquid, comprising:
  I. providing at least one reactor, said at least one reactor selected from a batch reactor containing liquid or a horizontal flow reactor through which a liquid stream is passed continuously, said liquid being contaminated by colloidal particles; and
  II. using mechanical means moving horizontally in the liquid.

Controlled oscillation generated in the treated liquid leads to particle aggregation and hence improves their separation from the water. The process of the invention is optionally carried out in the presence of one or more added coagulants, e.g. aluminum sulfate ("alum"). In some embodiments of the present invention a good separation may be achieved with the aid of a decreased amount of coagulant (flocculating agent), e.g. below 8 mg/L (e.g. for treatment of colloidal suspension having initial turbidity of about 50 NTU), whereas a greater amount of coagulant is needed in conventional methods.

The present invention also relates to a system for carrying out the process of the invention as described herein. According to one embodiment, the system relates to an apparatus comprising:

I. at least one reactor, and
II. mechanical means, said mechanical means moving horizontally in the liquid thereby forming controlled oscillation accelerating, decelerating and reversing movement in the liquid,
III. wherein said controlled oscillation enhancing simultaneous aggregation/flocculation and sedimentation in the liquid in the same reactor.

The horizontal direction defined herein relates to the direction substantially parallel to the treatment water surface and substantially perpendicular to the sedimentation direction of the particles. The reactor exemplifies a confined space wherein the controlled oscillatory movement is imparted to the portion of the liquid.

Preferably, the reactor is selected from a batch reactor and a horizontal continuous flow reactor.

Preferably, the reactor contains coagulants.

Preferably, the mechanical means have flexible operation parameters (such as oscillation frequency, amplitude, velocity, power, shape of oscillating element, its location and submersion in the treatment basin, etc.).

Preferably, the mechanical means comprise at least one engine, at least one arm and at least one plate, said at least one plate attached to said at least one arm, and said at least one arm connected to said at least one engine, wherein said at least one engine moves said at least one plate horizontally, and thus, said at least one plate forms controlled oscillations in the water. Preferably, the arm is a rod made of metal, wood, plastic and the like. Preferably, the plate is made of material selected from the group consisting of metal, wood, plastic and the like. Preferably, the plate has an aperture therein.

In some preferred embodiments, provided herein is a system for liquid purification from colloidal particles comprising a reactor, driving means, an arm placed within the reactor, having a distal end and a proximal end, wherein the proximal end of said arm is connected to the driving means, a plate element attached to the arm distal end, wherein said driving means are configured to manipulate the one or more arms distally and proximally in an oscillation motion. In some embodiments, the arm is a rod. In some embodiments, the driving means is a motor or an engine. In some embodiments, the driving means is configured to manipulate the arm in an oscillation motion by displacing the arm alternatingly in essentially opposing directions. In some embodiments, the driving means is configured to manipulate the arm in an oscillation motion by displacing the arm alternatingly in essentially opposing directions. Preferably, the oscillation motion is in the horizontal direction. In some embodiments, the plate comprises one or more orifices. In some embodiments, the plate is flat or bended and has a cross section shape selected from the group consisting of a rectangle, a polygon, an elongated polygon, a circle and an ellipse. In some embodiments, the volume in which the plate travels through within the reactor during the distal proximal oscillation motion is between 10% and 50% of the reactor volume.

In other preferred embodiments, provided herein is a process for removal of colloidal particles from a liquid comprising (i) providing along a flow axis at least one stream of said liquid contaminated with said colloidal particles, (ii) periodically displacing a portion of said stream in alternating directions essentially perpendicular to the sedimentation of the particles to enable grouping of said colloidal particles, and (iii) separating aggregated particles from the stream to provide at least a partially decontaminated stream. In some embodiments, the periodical displacement of a portion of the stream comprises alternatingly accelerating and decelerating the portion of the stream. In some embodiments, the periodically displacing of the liquid takes form of an oscillating motion. In some embodiments, the portion of the stream being displaced comprises between 10 and 50 percent of the total volume of said stream. In some embodiments, a periodicity of said periodical displacement is between 0.1 and 1 Hz. In some embodiments, the process further comprises providing a flocculant to said contaminated stream. In some embodiments, said flocculant is an aluminum, polyaluminum or ferric salt selected from sulfate and chloride, or a charged organic polymer. In some embodiments, the amount of said flocculant is at least 25% less than would be required for similar removal efficiency with the jar test. In some embodiments, said separating is performed essentially concomitantly with said periodical displacing of said portion of the liquid.

BRIEF DESCRIPTION OF THE FIGURES

FIG. 7 shows Table 1.
FIG. 8 shows Table 2.
FIG. 9 shows Table 3.
FIG. 10 shows Table 4.

DETAILED DESCRIPTION

Figure 1A:
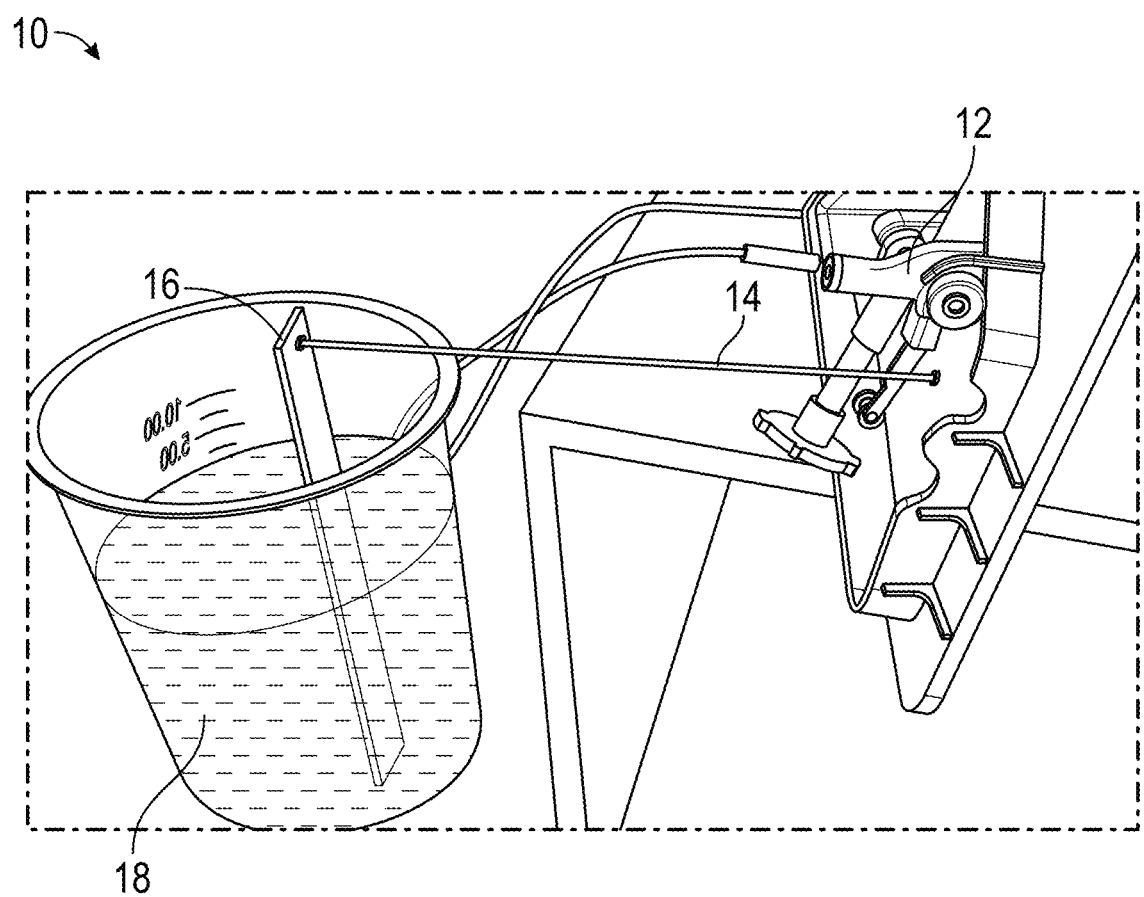
FIG. 1a shows a photograph of an apparatus for treating impure water or any other liquid containing impurities in accordance with one embodiment of the present invention.

A major challenge in water treatment is the removal of mineral colloids of submicron to micron size, which are hardly affected by the gravitational force. Common practice to aid the removal of these particles is the coagulation/flocculation process, involving chemicals addition to neutralize repulsive electrical forces (measured by the zeta potential and turbidity of the suspension), and slow mixing to enhance particles aggregation. The present invention relates to a method and systems for removing these colloids, based on physical flow manipulation by an oscillating device. The oscillation causes velocity gradients which change intermittently in time, space, and direction. This unique manipulation causes the suspended particles to aggregate and rearrange in separate groups, amenable to sedimentation.

The present invention relates to an action termed herein as "grouping", for removing the mineral colloids from water in a confined space, e.g. sedimentation basin. This phenomenon utilizes the dynamics of particles suspended in an oscillating flow field, e.g. in the form of a sinus wave or other flow accelerating, decelerating and reversing wave shapes. Under these conditions, it has been unexpectedly found that the particles can be made to accelerate and decelerate in intermittently changing directions, and finally form areas with higher particles density and concentration (grouping), which eventually facilitates the formation of flocs of increased sizes. The consequence is improved sedimentation even under the oscillation regime, i.e. prior to the usual sedimentation stage wherein the flocs are allowed to settle without movement. The present invention may yield environmental and economic benefits to the field of water treatment.

The present invention relates to a system comprising a reactor with liquid to be treated therein. According to an embodiment of the present invention, the reactor may be a batch reactor containing liquid or a (preferably horizontal) flow reactor through which a liquid stream is passed continuously. According to one embodiment the reactor is a tank or vessel comprising a volume and dimensions suited to the design flow rate. For example, for a flow rate of 1,000 cubic meters per hour, the respective volume may be from 150-1,000 m$^3$. Preferably, the reactor material comprises concrete or iron or plastic.

The system further comprises one or more driving means and one or more arms operatively connected to each of the one or more driving means. The driving means are configured to manipulate the one or more arms connected thereto. The arm may be e.g. a rod preferably made of material selected from the group consisting of metal, wood and plastic. Preferably, the arm comprises a plate element attached at its distal end. The proximal direction in reference to the arm herein refers to the direction of the arm connected to the driving means. The distal direction in reference to the arm herein refers to the direction away from the driving means. The length of the arm is typically suited to tank structure. The thickness/diameter of the arm is typically suited to support the mechanical strength needed to drive the oscillating plates. The driving means may be a motor, an engine or the like, preferably located outside the reactor, the driving means being operatively connected to the oscillating plates.

The driving means are configured to manipulate the arm in an oscillation motion, displacing the arm alternatingly in essentially opposing directions. The oscillation wave regime can be versatile according to a sinus wave, trapezoidal, and others. Preferably, the displacing motion directions are in the horizontal direction, e.g. substantially parallel to the liquid surface of the reactor (and substantially perpendicular to the particles sedimentation direction).

The plate element is preferably flat with dimensions suited to tank configuration. The plate element may also have a curved geometry, and may have a plan projection shape of a rectangle, a polygon, an elongated polygon, a circle, an ellipse, and any mixed or compound shape, as long as the oscillating motion is created as described herein. The plate element is preferably made of material selected from the group consisting of metals and plastic. Optionally, the plate may comprise one or more orifices in it. Without being bound by an exact theory it is believed that the orifices may improve the aggregation efficiency, as demonstrated herein. The plate and the arm dimensions are fitted to the reactor dimensions.

The oscillation motion of the arm causes the plate to travel distally and proximally relatively to the contaminated liquid stream, within the reactor causing a wave stream controlled by frequency, amplitude, and wave type, thereby affecting the flow velocity and oscillations' power. The velocity gradients in the liquid are created by the accelerating and decelerating motion of the plate.

The oscillation motion of the oscillating elements, e.g. plates, inside the contaminated stream, may be described by the fraction of the total volume wherein the oscillating elements travel to create the accelerating, decelerating, and reversing velocity gradients in the stream. The volume of the contaminated stream through which the plate travels within the reactor during the oscillation motion is usually between 10% and 50% of the reactor volume.

The oscillation motion may also be expressed by the power of the flow. The power (P in watt) of the oscillating motion suitable for the present invention may be readily calculated according to the following expression:

$$P = C_D * A * \rho_W * \left(\frac{V_e^3}{2}\right)$$

where $C_D$ is the drag coefficient for a flat blade, A is the total area (one side) of blade [m$^2$], $\rho_w$ is the density of the water and $V_e$ is the "liquid relative velocity"=difference between paddles velocity and water weighted velocity [m/s].

The system comprises a control unit such as a microprocessor. The microprocessor may be programmable according to the system operator requests. The programmable features that the control unit controls include: oscillation frequency, amplitude, velocity, power, blade location and submersion in the treatment basin.

Referring now to FIG. 1a, illustrated is an apparatus 10 for treating impure water or any other liquid containing impurities in accordance with the present invention.

Apparatus 10 comprises a tank 18 and mechanical means comprising an engine 12, an arm 14, and a plate 16. Such mechanical means having flexible operation parameters. Tank 18, containing impure water or any other liquid containing impurities, e.g. colloidal dispersion, may be a batch reactor, a horizontal flow reactor or the like. In accordance with the present invention, plate 16 is attached to arm 14, and arm 14 is connected to engine 12. Plate 16 may have a rectangular cross-section or any other shape, and may be made of metal, wood, plastic or any other materials. Arm 14 may be a rod made of metal, wood, plastic or any other materials. According to a preferred embodiment, engine 12 moves arm 14 horizontally, and thus, moves plate 16 horizontally within the liquid. Such horizontal movements of plate 16 induce oscillations in the liquid which enhance particle aggregation in the liquid. Tank 18 may have a cylindrical, rectangular or any other shape. If tank 18 is cylindrical in shape, then for optimal results, i.e., for enhanced particle aggregation, it is preferred that arm 14 moved horizontally across cylindrical tank 18 along any line segment of the cylindrical tank 18. In accordance with the present invention, various features of the oscillatory motion can be adjusted to control the horizontal movement of plate 16 in tank 18.

It should be noted that in case of a horizontal flow reactor, plate 16 may be installed either vertical, in parallel or at any desired angle to the direction of the liquid flow.

In accordance with the present invention, apparatus 10 may comprise multiple components, i.e., multiple tanks (reactors) 18, multiple arms 14, multiple plates 16 and multiple engines 12.

Figure 1B:
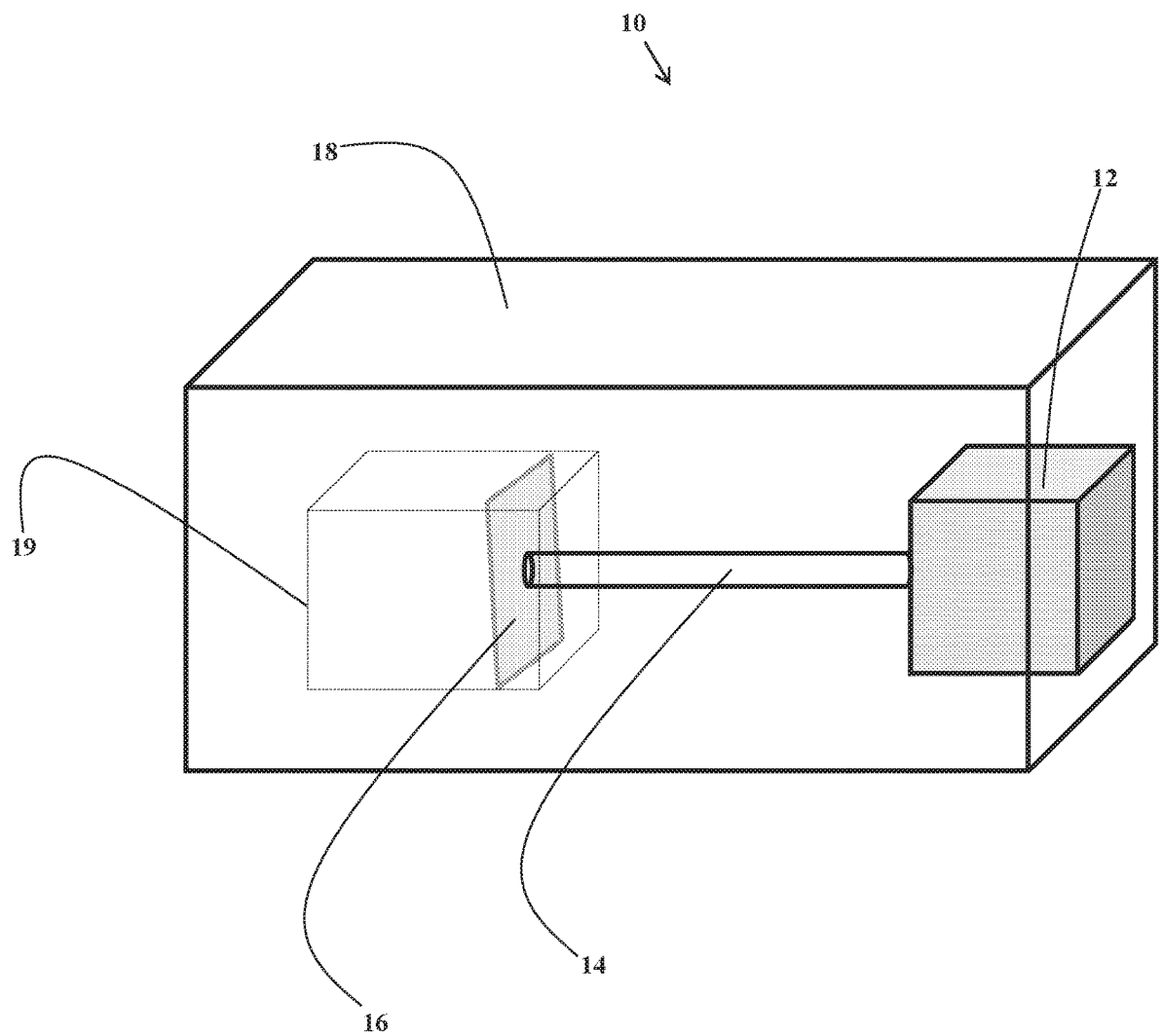
FIG. 1b shows a schematic drawing of the apparatus according to an embodiment of the present invention.

FIG. 1*b* schematically demonstrates the apparatus, and further shows the volume in which the plate travels through within the reactor during the oscillation motion (within dotted lines 19), which, as said, is usually between 10% and 50% of the reactor 18 volume.

In a further aspect, provided herein is a process for purification of a liquid by enhancing grouping of colloidal contaminants in oscillating flows.

Accordingly, one aspect of the invention relates to a process for removal of colloidal particles from a liquid, e.g., an aqueous medium, comprising I. providing along a flow axis at least one stream of said liquid contaminated with said colloidal particles, II. periodically displacing a portion of said stream in alternatingly horizontal directions (e.g. in a direction essentially perpendicular to the sedimentation of the particles, and within or parallel to the plane of the flow axis) to enable grouping of said colloidal particles, for a predetermined time interval, and III. separating grouped/aggregated particles from the stream to provide at least a partially decontaminated stream. Preferably, the periodical displacement of a portion of the stream comprises alternatingly accelerating and decelerating the portion of the stream.

Optionally, the periodically and alternatingly displacing of the liquid takes form of an oscillating motion. The oscillating motion is preferably characterized by consecutive acceleration, deceleration, and reversal of the direction of the motion.

The contaminated liquid may be characterized by a concentration of the contaminants. For colloidal suspensions turbidity is a common index measured by the Nephelometric Turbidity Unit (NTU), and the reduction in the turbidity is a common evaluation index to assess the process efficiency.

Preferably, the process further comprises providing a flocculating agent to said stream of contaminated liquid.

Under the process, the grouping of the particles may occur prior to or essentially concomitantly with flocculation, leading to increase of particle size during the oscillation motion of the liquid, such that separating of the flocs may be achieved faster, e.g. concomitantly with the grouping and/or flocculation.

The periodical and alternating displacement of a portion of the liquid causes velocity gradients in the liquid to change intermittently in time, space, and direction, usually reversing the direction. This may usually be carried out such that the oscillations in the liquid create a propagating or a standing wave. The direction of the gradients may be dictated by the form of the oscillation. For example, for a sine wave the velocity gradients change in the opposing directions according to the frequency of the sine.

Moreover, the portion of the contaminated stream that is periodically displaced, i.e. wherein the velocity gradients are the highest, preferably forms at least 10% and up to 50% of the volume of the stream, e.g. the separation jar or sedimentation basin. The flow velocity, periodicity, amplitude, and power of the oscillations are chosen such that the flow generated thereby does not break or redisperse the groups or flocks of the particles.

For example, the oscillations are therefore preferably at a frequency below 1 Hz, further preferably between 0.1 Hz and 0.5 Hz, at amplitudes adapted to specific reactor/basin configurations, such that the oscillations within the portion of the stream as discussed herein, do not redisperse the flocs. In some exemplary embodiments, the velocity of the oscillating elements is thus also adapted to specific reactor/basin configurations, and may be between about 2.5 and about 5.5 centimeters per second.

It is readily understood that the operational parameters (frequency, amplitude, velocity) are not independent values and may be expressed one via the other, e.g. the frequency and the amplitude define the mean flow velocity during the oscillations. The power, on the other hand, describes the motion of the liquid within the stream and may be used to describe the flow.

A flocculating agent may be provided into the suspension to improve flocculation. The flocculating agent may be a polyvalent ionic compound, preferably a polyvalent ion salt. The examples of suitable polyvalent ionic compounds include but not limited to aluminum sulfate and ferric chloride. In a preferred embodiment, the process is carried out with no or low amount of added flocculating agent. Further preferably, the process may be carried out with less flocculating agent than would be required under an ordinary flocculation/sedimentation process.

A further specific aspect of the invention provides a process for the removal of colloidal particles from a liquid, e.g., an aqueous liquid, comprising:

providing at least one reactor, said at least one reactor selected from a batch reactor containing liquid or a horizontal flow reactor through which a liquid stream is passed continuously, said liquid being contaminated by colloidal particles; and using mechanical means moving horizontally in the liquid.

Controlled oscillation generated in the treated liquid leads to particle aggregation and hence improves their separation. The process of the invention is optionally carried out in the presence of one or more added coagulants, e.g. aluminum sulfate ("alum"). In some embodiments of the present invention a good separation may be achieved with the aid of a decreased amount of coagulant (flocculating agent), whereas a greater amount of coagulant is needed in conventional methods.

In accordance with the present invention, such a process has a wide flexibility for the following design and operation parameters:

1. concentration of the added chemical;
2. type of the added chemical;
3. oscillation frequency;
4. average oscillation velocity;
5. the shape of the reactor/sedimentation basin;
6. direction of movement and trajectory/path;
7. amplitude of motion;
8. reaction (retention) time;
9. shape of the oscillating body and/or perforations therein;
10. size of the oscillatory body and/or perforations therein;
11. position of the oscillating body within the tank; and
12. submersion of the oscillating body in the liquid.

Flocculating agent aluminum sulfate (known as "alum"), is a standard chemical used in such water works, was tested as demonstrated in the experimental section below, in a range of 0 to 20 mg/L. A comparison between the conventional Jar-test apparatus for water coagulation and flocculation and the apparatus and process of the present invention, shows that the amount of the alum can be reduced significantly, when the water is treated according to the present invention.

EXAMPLES

The present invention was tested under experiments with various operational conditions relating to e.g. oscillation frequency, motion amplitude and blade shape. The embodiments of the present invention are also compared to the traditional coagulation/flocculation process in the treatment of same suspensions. The results prove that even gentle oscillations can enhance flocculation and sedimentation, sometimes simultaneous and in the same reactor, in shorter periods.

Methods and Materials

Kaolin clay nanotubes, CAS: 1332-58-7, of a formula $H_4Al_2O_9Si_2*2H_2O$ (average size 1-3 μm) were supplied by Sigma-Aldrich, Israel. Sodium chloride, sodium bicarbonate, and calcium chloride were supplied by Daejung chemical & metal Co. Ltd, Frutarom Industries Ltd., and Sigma-Aldrich respectively, Israel. Aluminum sulfate hexadecahydrate, CAS 7784-31-8, was supplied by Mercury-ltd, Israel.

Turbidity was measured with a Hach2100P Portable Turbidimeter. Sample size was 20 mL. A correlation between the turbidity and kaolin concentration was established, as the amount of dispersed matter versus the measured turbidity in Nephelometric Turbidity Units (NTU), giving an exponential relation with the power of about 0.9 and the correlation coefficient of about 0.97.

The pH was measured with Eutech instruments apparatus, type pH 150. Zeta potential was measured with Brokkhaven instrument type Zeta plus, each sample contained 1.5 mL of dispersion.

The conventional jar tests were performed in a standard Philipps and Bird™ PB-700 apparatus, equipped with 2-L beakers, to test coagulation, flocculation and sedimentation under standard conditions, as described, inter alia, in ASTM D2035.

Experimental dispersion (to simulate typical surface runoff) was prepared by adding a mixture of 150 mg of sodium chloride, 75 mg of sodium bicarbonate and 45 mg of calcium chloride to about 1.5 liters of double distilled water. The resultant pH was at 7.2±0.2 and water temperature at 23±2° C. The initial turbidity was set to about 60 NTU, equivalent to suspended solid concentration of about 191 mg/L ($C=4.7224*NTU^0.9042$), by adding 10 mL of kaolin stock solution (10 g/L), and dispersing for 12 hours with a magnetic stirrer.

A simplified laboratory prototype of the apparatus tested herein was built as seen in FIG. 1a. The prototype was based on a simple engine which moved horizontally a rod attached to a plate (sewing machine was adapted to move the rod). Various oscillating velocities were used to control the horizontal movement of the plate in a tank, but frequencies of the drive could not be precisely controlled.

Figure 1C:
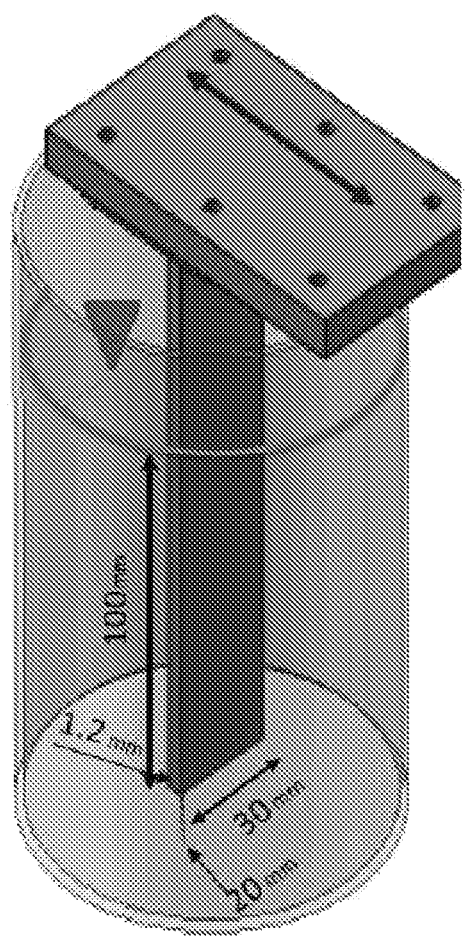
FIGS. 1c shows a schematic drawing of a further embodiment according to the invention.
Figure 1D:
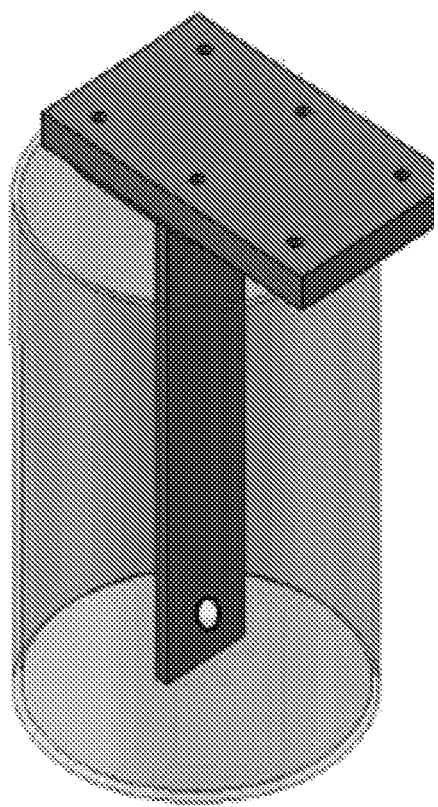
FIG. 1d shows a schematic drawing of a further embodiment according to the invention and demonstrates an orifice in the moving element.

Two types of plates were attached: a solid rectangular plate of 10×3 cm (type 1), and an identical plate with an orifice of 0.5 cm in diameter (type 2). The both types of oscillation bodies are demonstrated schematically in the FIGS. 1c and 1d.

In next stages an advanced oscillator device was designed to generate an oscillating flow in the form of a precise sinus wave with a wide range of frequencies and amplitudes. The oscillating paddles (i.e. plates) were assembled on a Thompson M-55 linear motion, manufactured by Thompson which was connected to PRO-2 motor, manufactured by Servotronix, Israel. The motor was controlled by Servotronix servo drive CDHD which was in turn controlled by a Servotronix Multi-Axis Motion Controller. The latter can generate any kind of wave motion in a determined frequency and amplitude. The motor controller was controlled by a computer interface wherein all motion parameters were defined. Thompson linear motion system type M55 provides a linear track equipped with ball screw drive and ball guidance, whereon a four-paddle holder was assembled enabling to conduct four experiments simultaneously with the desired motion pattern. The servo motor PRO2 provides a wide range of torque ratings and motor options, particularly suitable for highly dynamic applications with strict requirements for high accuracy and stability. PRO2 servo motors are equipped with 20 bit absolute encoder. PRO2 servo motors are also compatible with the CDHD drive controllers. The motion controller (Servotronix, Israel) supports 1 to 6 axes of synchronized, coordinated motion and generates any kind of wave forms with frequencies ranging between 0-200 Hz and amplitude 0-1000 mm.

To summarize this apparatus simply, it is a kind of piston that can move in an oscillating manner forward and backward. The movement is controlled by a computer or a PLC which can select the oscillation frequency, wave shape, and amplitude (and thus also the movement velocity). Several rods can be connected to the moving piston. Various shapes of paddles can be connected to each rod. Thus, each rod and its connected paddle can be immersed in a laboratory beaker (in various positions) to test this process.

Example 1—Preliminary Qualitative Tests

Figure 2A:
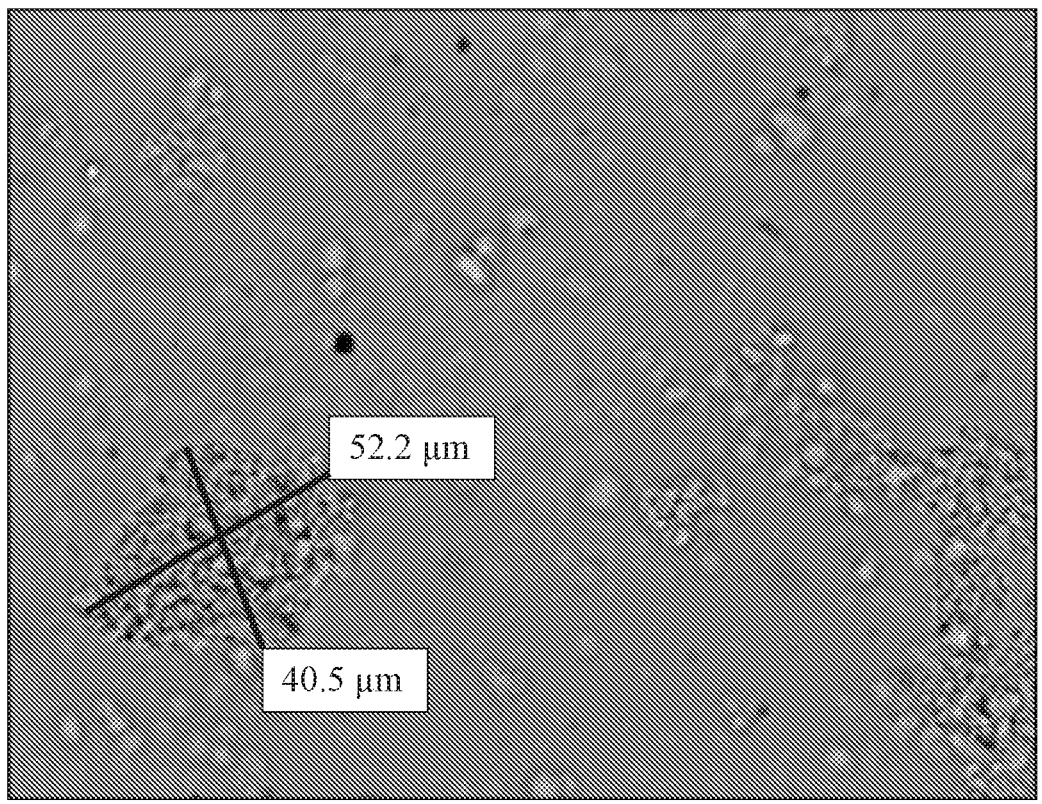
FIG. 2a shows a qualitative microscopic picture of an example of the suspension obtained via oscillation.
Figure 2B:
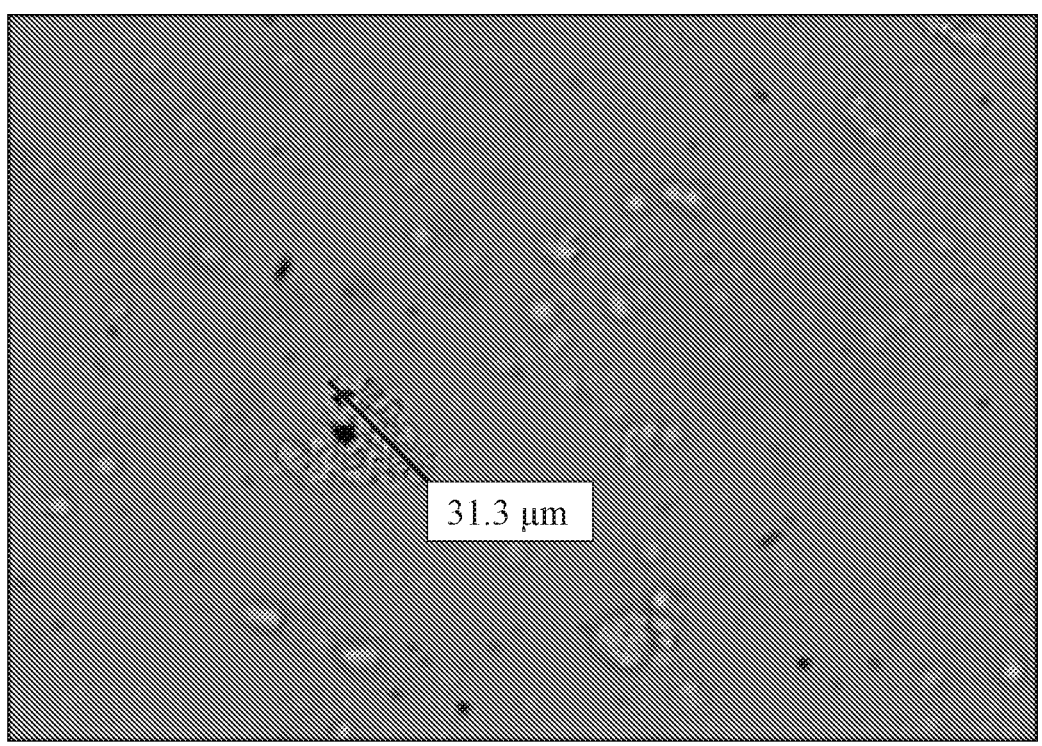
FIG. 2b shows a qualitative microscopic picture of an example of the suspension obtained by a jar test.

To compare the two technologies, preliminary qualitative tests were carried out followed by microscopic analysis of the resulting suspensions. Such preliminary qualitative tests were carried out using a silica suspension (D<3 micron) having an initial turbidity of 50 NTU, with no addition of coagulants. FIG. 2a shows a qualitative microscopic picture of the suspension obtained via oscillation. FIG. 2b shows a qualitative microscopic picture of the suspension obtained by a jar test. As seen in the figures, larger aggregates were formed by the oscillation technique.

Example 2—the Performance of a Prototype Apparatus

Kaolin suspension with 100-NTU initial turbidity was mixed with aluminum sulfate hexadecahydrate ("alum") to final concentrations between 0 and 8 mg/L. Samples were drawn in the diametral plane parallel to oscillation axis at half radius distance from the center of the beakers. At the preliminary coagulation stage, alum solutions (forming various concentrations between 0-8 mg/L in the water) were added to the water (beakers of 2 liters volume, diameter 12 cm) and the mixture was rapidly mixed at 100 RPM for 5 min. Then, oscillation was applied at 3 Hz and 2 cm amplitude, for 25 minutes, followed by quiescent sedimentation, e.g. no mixing, for 30 minutes. In parallel, a standard jar test was performed with 2-L beakers, performing same rapid mixing stage, slow mixing at 30 rpm, and 30 minutes sedimentation.

Turbidity measurements were performed at the beginning of the process before adding the coagulant, and at the end, e.g. after 30 minutes of sedimentation.

Figure 3A:
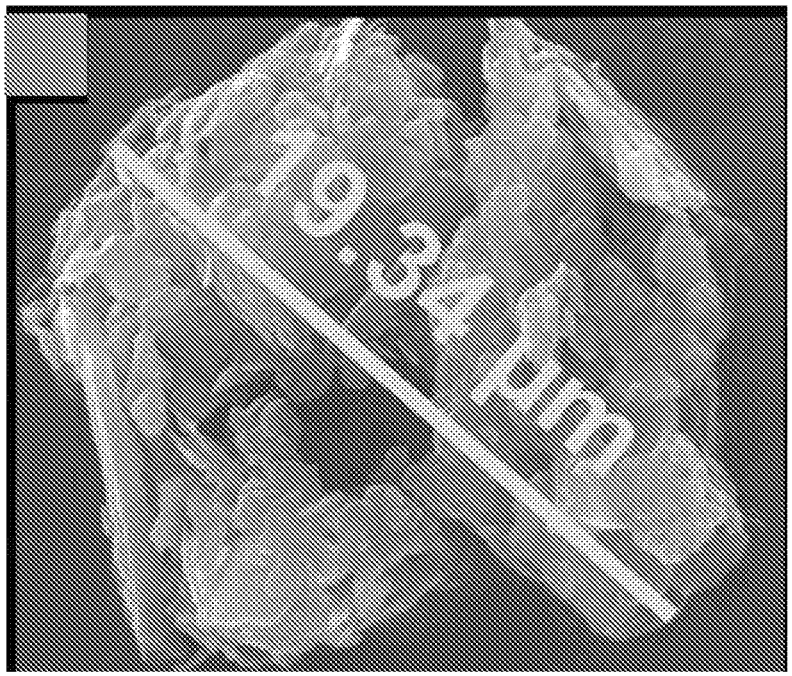
FIG. 3 shows typical kaolin particles after (a) a conventional jar test and (b) an oscillating system.
Figure 3B:
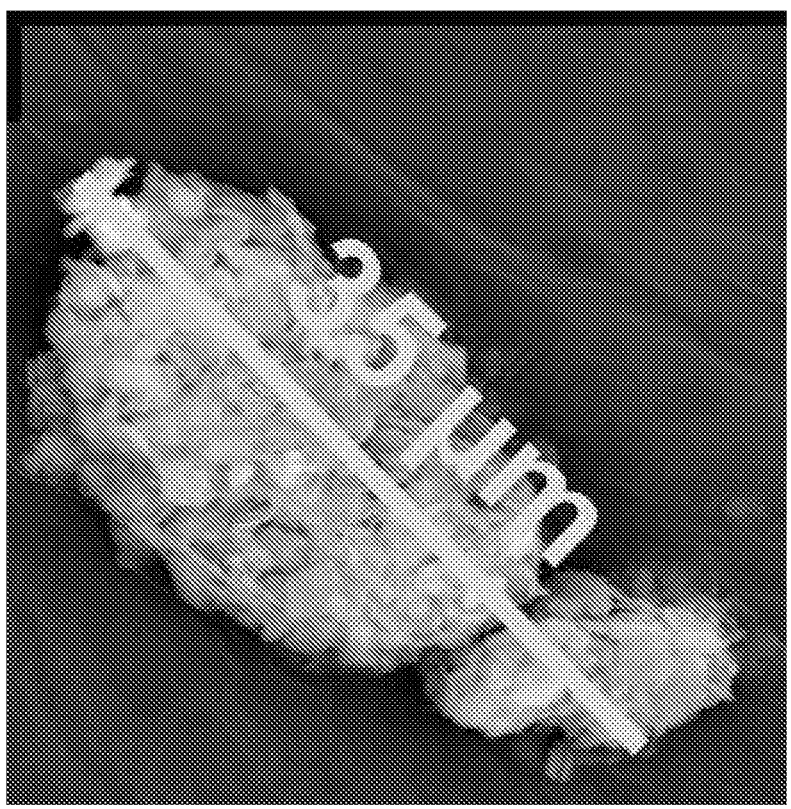

FIG. 3 shows typical kaolin particles analyzed with a scanning electron microscope (SEM): lyophilized water sample after a conventional jar test with 8 mg/L alum (FIG. 3a) and lyophilized water sample after oscillation in the cylindrical tank with 8 mg/L alum (FIG. 3b). As seen in the FIGS. 3a&b, typical particles obtained in an oscillation system are almost twice as bigger than the particles obtained by a conventional jar test.

Figure 4:
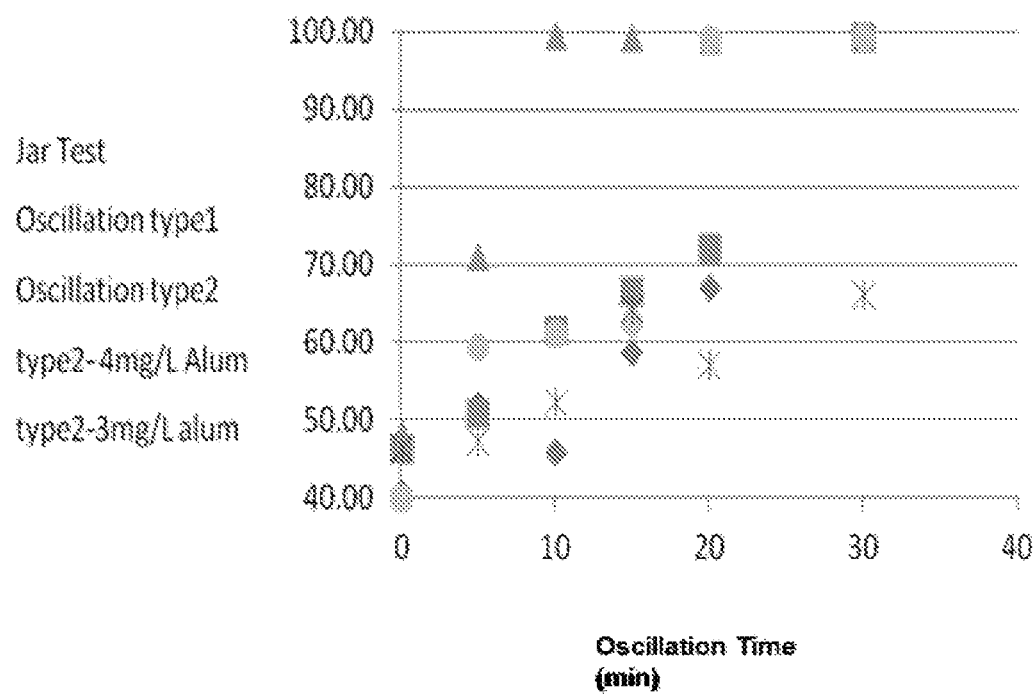
FIG. 4 shows a graphical representation of turbidity removal rate of colloidal particles in a process by a prototype apparatus.

Further tests were carried out using two types of oscillation plates for several doses of alum. The results illustrate turbidity removal as a function of oscillation time, alum dose, and type of oscillation, summarized in the table 1 (see FIG. 7) and in FIG. 4. Solid triangles (▲) represent oscillation type 2 with 6 mg/L of alum. Solid circles (●) represent oscillation type 2 with 4 mg/L of alum. Solid squares (■) represent oscillation type 1 with 6 mg/L of alum. Solid diamonds (♦) represent the jar test with 6 mg/L of alum. Asterisks (*) represent oscillation type 2 with 3 mg/L of alum.

It is evident from the results, that major changes in water composition can be achieved when using less chemical, by changing the physical-mechanical condition of the water. This test demonstrates that the current induced oscillations improve the performance. A change in the oscillator geometry (type 2—perforated blade) further improves process efficiency.

The further results are summarized in the table 2 (see FIG. 8):

Based on these results, it is concluded that coagulant dosage can be reduced by at least 50% when using oscillation instead of rotating pedals.

Reactor Shape Effect

A shape of the reactor was tested: an oscillation system including a rectangular container with dimensions of 11.5 cm×11.5 cm×19 cm, an oscillation system including a cylindrical tank as above, and a conventional jar test.

The cylindrical tank was the 2-L beaker as described above. The oscillation was performed as above. In the rectangular tank, the blade (3×10 cm) was immersed in the middle of the short side of the rectangle and at the quarter of the long side of the rectangle until the end of the paddle was 2 cm above the bottom. Oscillation was performed at 1 Hz for 65 minutes. The results are summarized in the table 3 (see FIG. 9).

As seen in the table 3 (see FIG. 9), the experimental results clearly show the advantage of both oscillating systems over the jar test as larger aggregates are generated during the oscillation process.

Example 3—Performance of the Oscillator

Beakers of 2 liters volume (diameter 12 cm) were used. The paddles (3×10 cm) were placed in the beakers such that the median was at half radius of the beaker. Samples were drawn in the diametral plane parallel to oscillation axis at half radius distance from the center of the beakers. The oscillation amplitude was 20 mm for all experiments in the current example.

Jar test was performed by mixing suspensions with the coagulant for 5 minutes at 100 rpm, and then at 30 rpm for 25 minutes.

Frequency Effect

Kaolin stock solution (10 g/L), thoroughly dispersed for 12 hours with a magnet stirrer, was diluted to 60 NTU. Flocculant (aluminum sulfate hexadecahydrate) was added from a stock solution into three of the four beakers, to the final concentration of 5, 10 or 20 mg/L. The suspensions were mixed at 100 rpm for 5 minutes in the jar test apparatus, and then placed into the oscillator for 25 minutes. The dispersions were then left untouched for another 30 minutes.

The oscillator was operated at 0.1 Hz, 0.5 Hz and 1.0 Hz, at velocities 0.8, 4 and 8 cm/s, respectively.

The results indicate that 0.5 Hz had the highest removal percentage in all sampling times and over all tested coagulant concentrations (0, 5, 10, 20 mg/L).

Figure 5A:
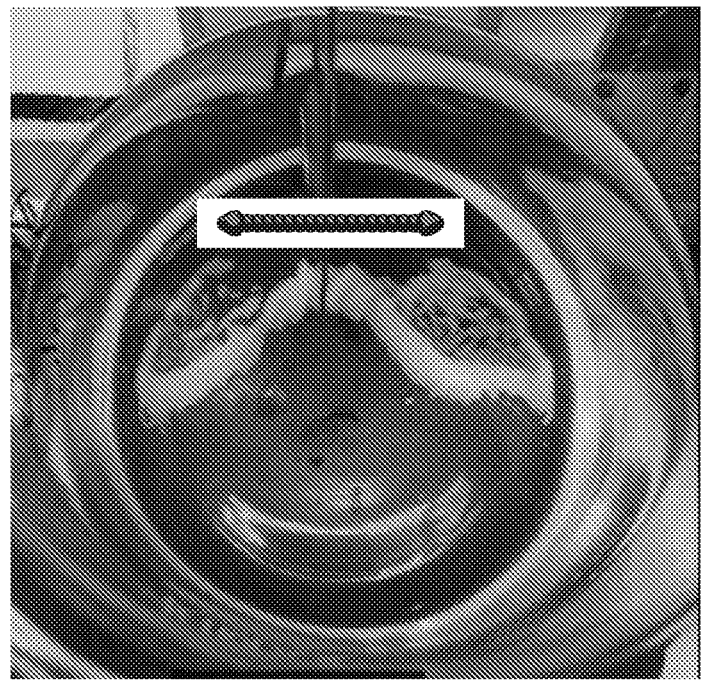
FIG. 5 demonstrate representative example photographs of the particles sedimentation pattern at different frequencies after a settling stage.
Figure 5B:
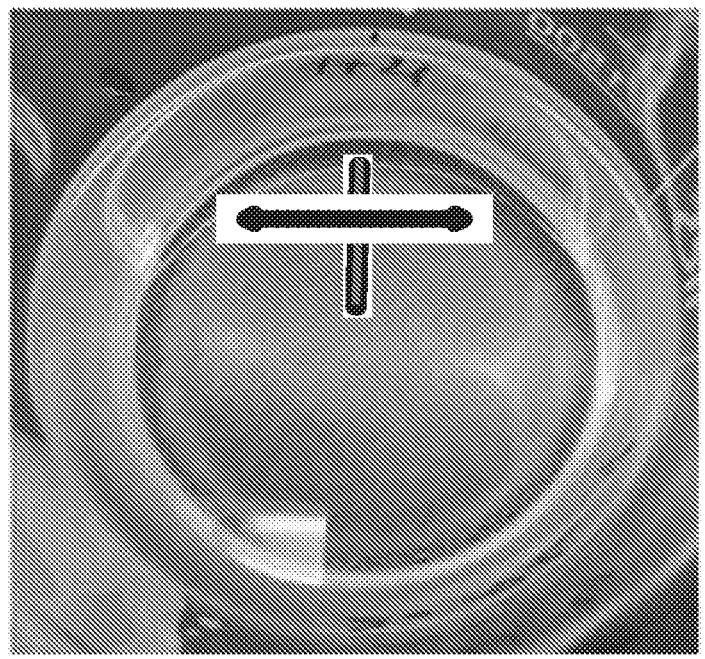

FIGS. 5a and 5b demonstrate representative photographs of the particles sedimentation pattern at different frequencies after the settling stage. Distinct areas of sedimentation are formed at 0.5 Hz (FIG. 5a) under the experimental conditions.

The results are summarized in table 4 (see FIG. 10) as average removal percentages comma standard deviation of the average:

This oscillating flow generates the highest velocity gradient mainly where the paddle changes its direction. As a result particles tend to form clusters in those areas which promotes flocs formations, followed by settling. A similar flow pattern is generated by oscillations of 1 Hz, however, due to relatively high flow velocities turbulent flow around the settling zones is formed which generates higher vertical velocities than the settling velocity of the flocs, therefore causing constant re-suspension of the particles. At 0.1 Hz, however, the slow flow motion generates slower flow velocity thus allowing settling to occur throughout the beaker (FIG. 5b).

Comparison with Jar Test

Comparing the oscillation procedure at 0.5 Hz with the conventional jar test demonstrated that both techniques succeeded in achieving very high removal percentage after the settling stage; however a high removal percentage of 86% and 79% after merely 15 minutes only of flocculation using 10 mg/L of Alum, as opposed to very low removal (<14%) by the jar test using these Alum doses, indicate the significant advantage even against an effective state-of-the-art procedure.

Figure 6:
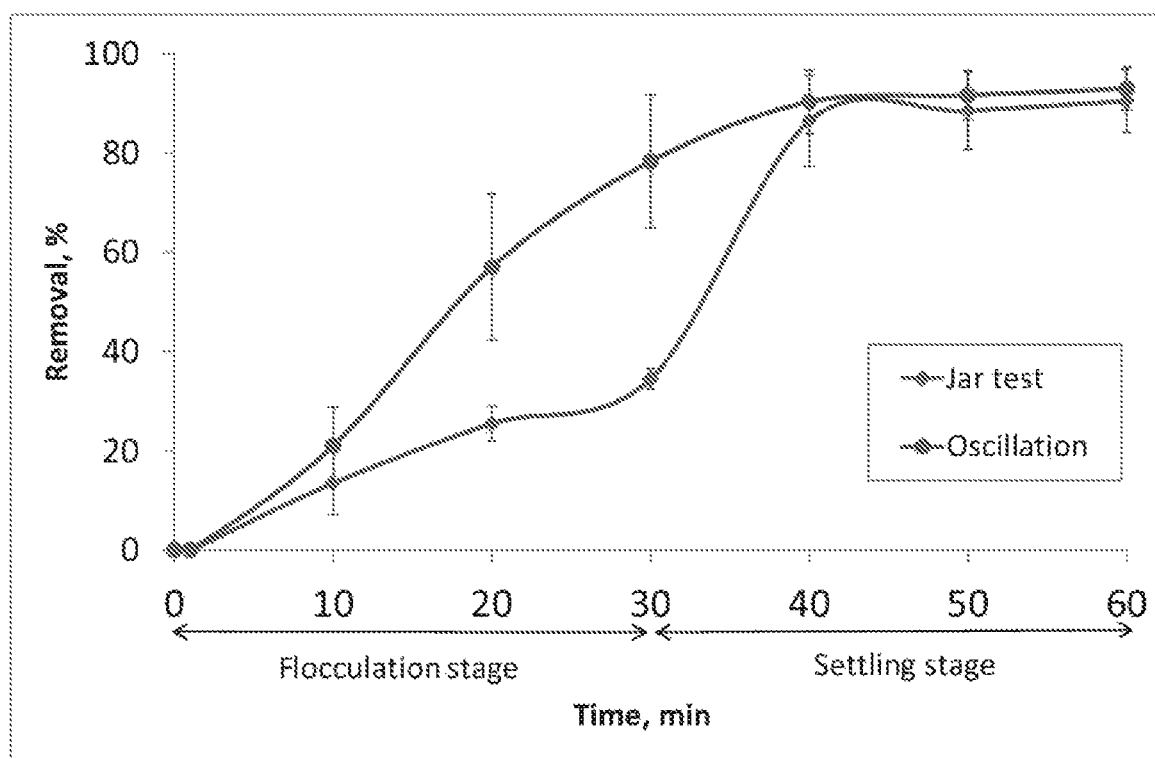
FIG. 6 demonstrates a graphical representation of the sedimentation rate of colloidal particles in a process according to the invention and in a conventional jar test.

The results with more frequent testing are shown in the FIG. 6. The figure demonstrates the percentage of turbidity removal (denoted as "Removal. %"), versus time (denoted "Time, min"). The time span between 0 and 30 minutes represents the agitation (denoted as "Flocculation stage"), whereas the time span between 30 and 60 minutes represents the sedimentation (denoted "Settling stage"). The solid circles (●) represent oscillation procedure, the solid diamonds (♦) represent the jar test. The results unequivocally demonstrate the superiority of the present test, showing that even without the quiescent sedimentation stage the process of the present invention provides adequate colloids' removal.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A system for promoting coagulation and flocculation of colloidal particles within a liquid contained in a container, comprising:
    said liquid container;
    driving means;

one or more arms placed within the liquid container, each arm having a distal end and a proximal end, wherein the proximal end of each said arm is connected to the driving means;

a plate element attached to each arm distal end;

wherein said driving means are configured to manipulate the one or more arms distally and proximally in a horizontal oscillation motion;

wherein the volume in which the plate travels within the liquid container during the distal-proximal oscillation motion is between 10% and 50% of the liquid container filled volume; and wherein a periodicity by which one or more arms are manipulated distally and proximally in an oscillation motion is between 0.1 Hz and 1 Hz.

2. The system according to claim 1, wherein each said arm is a rod.

3. The system according to claim 1, wherein the driving means is configured to manipulate the one or more arms in said oscillation motion by displacing each of said arms alternatingly in essentially opposing directions.

4. The system according to claim 1, wherein the plate comprises one or more orifices.

5. The system according to claim 1, wherein the plate is flat or bended and has a cross section shape selected from the group consisting of a rectangle, a polygon, an elongated polygon, a circle and an ellipse.

6. A process for promoting coagulation and flocculation of colloidal particles within a liquid contained in a container, comprising:
   (i) providing along a flow axis at least one stream of said liquid contaminated with said colloidal particles,
   (ii) periodically displacing a portion of said stream in alternating directions essentially perpendicular to a sedimentation of the particles to promote grouping of said colloidal particles, and
   (iii) separating aggregated particles from the stream to provide at least a partially decontaminated stream;
   wherein the periodically displacing of the liquid takes the form of a horizontal oscillating motion and wherein said portion of the stream being displaced comprises between 10 and 50 percent of the total volume of said stream; and
   wherein the periodicity of said portion displacement in alternating directions is between 0.1 Hz and 1 Hz.

7. The process according to claim 6, wherein the periodical displacing of a portion of the stream comprises alternatingly accelerating and decelerating the portion of the stream.

8. The process according to claim 7, wherein the periodically displacing of the liquid takes form of an oscillating motion.

9. The process according to claim 6, further comprising providing a flocculant to said contaminated stream.

10. The process according to claim 9, wherein said flocculant is an aluminum salt, polyaluminum salt or ferric salt, said ferric salt is a sulfate or chloride salt, or an organic polymer, or a mixture of flocculants.

11. The process according to claim 9, wherein the amount of said flocculant is at least 25% less than would be required for similar removal efficiency with ajar test as specified in ASTM D2035 standard.

12. The process according to claim 6, wherein said separating is performed essentially concomitantly with said periodical displacing of said portion of the liquid.

13. The process according to claim 6, performed in a single vessel carrying out simultaneous flocculation and sedimentation.

\* \* \* \* \*